United States Patent Office 3,792,179
Patented Feb. 12, 1974

3,792,179
TRANQUILIZING METHOD EMPLOYING
ARACHIDONIC ACID
Walter Joseph Potts, Glenview, Ill., assignor to
G. D. Searle & Co., Chicago, Ill.
No Drawing. Filed June 9, 1971, Ser. No. 151,564
Int. Cl. A61k 27/00
U.S. Cl. 424—318                           1 Claim

ABSTRACT OF THE DISCLOSURE

The administration of tranquilizing amounts of a prostaglandin such as PGE$_1$, PGE$_2$ and PGA$_2$ or of a prostaglandin precursor such as arachidonic acid to mammals results in tranquilization as contrasted to generalized depression.

---

The present invention is concerned with compositions containing tranquilizing amounts of a suitable prostaglandin or prostaglandin precursor and with methods of utilizing such compositions to induce a tranquil state in mammals. These compositions are particularly advantageous in that they lack the generalized depressant effect often associated with transquilizing agents. In addition, they are advantageously shortacting.

Prostaglandins suitable for the purpose of this invention are typified by 15(S)-11β,15-dihydroxy-9-oxoprost-13-trans-enoic acid (PGE$_1$), 15(S)-11β,15-dihydroxy-9-oxo-prosta-5-cis-13-trans-dienoic acid (PGE$_2$) and 15(S)-hydroxy-9-oxoprosta-5-cis-10,13-trans-trienoic acid (PGA$_2$). Those substances are structurally represented below:

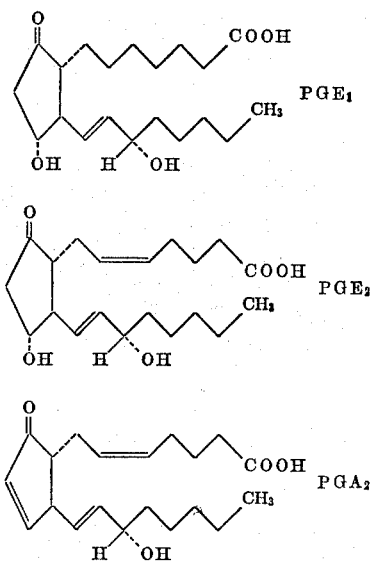

Prostaglandin precursors suitable for utilization in the compositions and method of this invention are exemplified by arachidonic acid, whose structure is shown below:

$CH_3CH_2CH_2CH_2CH_2(CH\!=\!CHCH_2)_4CH_2CH_2COOH$

The esterified derivatives of the aforementioned prostaglandins are likewise suitable for the purpose of the present invention. Thus, the 11- and 15-hydroxy groups are reacted with a lower alkanoic acid anhydride or halide to afford the corresponding lower alkanoates and the free carboxyl groups is esterified by reaction with a lower alkanol to produce the corresponding lower alkyl esters.

The lower alkanoates disclosed hereinbefore are typified by the formate, acetate, propionate, butyrate, valerate, caproate and heptanoate together with the corresponding branched-chain isomers. The term lower alkyl used to describe the instant carboxylic esters includes methyl, ethyl, propyl, butyl, pentyl, hexyl, heptyl and the branched-chain isomers thereof.

In addition, the 15-keto, 15-methyl-15-hydroxy and 3-oxa derivatives of the aforementioned prostaglandins are suitable for the purpose of this invention. These derivatives are represented by the following structural formulae

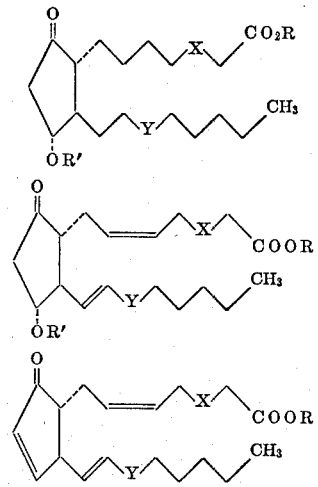

wherein R is hydrogen or a lower alkyl radical, R' is hydrogen or a lower alkanoyl radical, X is a methylene or oxa radical and Y is a carbonyl or

radical.

Also suitable for the purposes of this invention are the pharmaceutically acceptable salts of the aforementioned prostaglandins as illustrated by the salts of alkali and alkaline earth metals such as lithium, sodium, potassium, calcium, and magnesium and salts of ammonia or a primary, secondary or tertiary basic amine such as mono-, di-, or triethylamine, benzylamine, a heterocyclic amine such as piperidine or morpholine, or an amine containing one or more water-solubilizing or hydrophilic groups such as triethanolamine and phenylmonoethanolamine.

The separation of transquilizing and sedative properties characteristic of the compositions of this invention is most surprising in view of the report by E. W. Horton, Brit. J. Pharmacol., 22, 189 (1964) to the effect that the injection of PGE$_1$, PGE$_2$ or PGE$_3$ into cats produced prolonged sedation and injection into chicks resulted in profound sedation. S. W. Holes and E. W. Horton, Prostaglandin Symposium of the Worcester Foundation for Experimental Biology, p. 21 (P. W. Ramwell and J. E. Shaw, eds., Interscience, New York, 1968), furthermore describe the sedative activity of PGE$_1$ in mice. Those authors reported an additional indication of depressant effect, i.e. the increase of hexabarbitone sleeping time by PGE$_1$ upon administration to mice.

Preparation of the instant prostaglandins can generally be accomplished by incubating corresponding carboxylic acids in the presence of appropriate mammalian tissue as disclosed in U.S. Pat. 3,296,091.

The prostaglandins of this invention are administered in dosage unit form including, but not necessarily limited to, sterile aqueous solutions for intravenous infusion, sterile solutions or suspensions for intramuscular injection or nasal instillation, intravaginal or rectal compositions such as suppositories, lozenges for sublingual administration, and tablets, capsules, solutions or suspensions for oral administration.

As is well known in the pharmacological art, the tranquilizing dose in any given instance depends upon the nature of the condition being treated and the severity, the route of administration, the species of mammal involved and its size and individual idiosyncrasies, the particular prostaglandin employed, etc. The tranquilizing dose for any particular prostaglandin can be determined by comparing its potency in a standardized test with that of a known standard for which the therapeutically effective dose is known. In the assay described hereinafter, $PGE_2$, for example, displays a potency similar to that of chlorpromazine, thus should be administered in a comparable dose. A dosage range of about 10–100 mg. is suitable, while a preferred dose for $PGE_2$ is about 40 mg. administered orally.

The following examples describe in detail various applications of the means of this invention and their implementation. However, the invention is not to be construed as limited thereby, either in spirit or in scope, since it will be apparent to those skilled in the art that many modifications both of techniques and of materials, may be practiced without departing from the purpose and intent of this disclosure.

EXAMPLE 1

To each of a group of 12 naive Charles River male rats weighing 200–225 g. is administered intraperitoneally 0.56 mg./kg. body weight of $PGE_2$ in a volume of 1 ml. normal saline/kg. body weight either 5 or 30 minutes before testing. Similar groups of 12 animals are treated in the identical manner except that either normal saline or 1.12 or 2.25 mg./kg. of $PGE_2$ is used. The rats are then placed in Lehigh Valley shuttle cages, are allowed to acclimate for approximately 1 minute, then are subjected initially to a 5 second conditioned stimulus, consisting of a tone and a light, and finally to a 0.2 ma. footshock delivered to the grid floor of the cage. The shock is automatically terminated after 30 seconds if the rat fails to respond. The animal can either avoid or escape the shock by moving to the other side of the shuttle cage. If the shuttle response occurs during the conditioned stimulus period, the conditioned stimulus is terminated, onset of the shock is prevented and the reaction is scored as an avoidance response. If the shuttle response occurs during the shock period, the shock is terminated and the reaction is scored as an escape response. Each conditioned stimulus presentation is separated by a 15 second interval. If the shuttle response occurs during that interval, it is scored as an intertrial interval response.

The results of this assay are shown in Table I. The data is analyzed by means of Student's t tests. From that data it is concluded that, in naive rats, the administration of $PGE_2$ 5 minutes prior to test produces a significant reduction in avoidance responses at doses of 0.56 and 2.25 mg./kg. body weight. A significant reduction in avoidance respones during trials 1–50 is produced when $PGE_2$ is administered at a dose of 2.25 mg./kg. 30 minutes prior to the test. A significant reduction in intertrial interval responses is produced at doses of 1.12 and 2.25 mg./kg. administered 5 minutes prior to test. A further indication of tranquilizing without generalized depressant properties is the lack of significant effect on escape latency, i.e. the time taken to escape the shock.

EXAMPLE 2

The test disclosed in Example 1 is repeated with similar groups of trained rather than naive rats weighing 300–325 g., which rats have been treated with 0.56, 1.12, 2.25 or 4.5 mg./kg. of $PGE_2$. In this study each group contains eight animals. The data is analyzed by means of paired Student's t tests. Table II summarizes the mean differences between the control session and the drug session. Positive numbers indicate the drug scores which are higher than control scores, while negative numbers indicate the drug scores which are lower than control. It is seen from those results that the administration of $PGE_2$ 5 minutes prior to test doses of 1.12, 2.25 or 4.5 mg./kg. causes a significant decrease in avoidance responses with no loss of escape responses, thus indicating a tranquilizing rather than generalized depressant effect. Injection 30 minutes prior to test likewise significantly reduces avoidance responses at doses of 0.56, 1.12 and 4.5 mg./kg., but the magnitude of decrease is lower. The separation between tranquilizing and generalized depressant properties is shown again by the pronounced effect of the drug on avoidance latency and longest run of avoidance responses with relatively little effect on escape latency.

EXAMPLE 3

The procedure of Example 1 is repeated using naive rats and 0.56, 1.12 and 2.25 mg./kg. doses of $PGE_1$. The results of tests carried out 5 minutes after injection are shown in Table III. It is apparent from those results that at all doses there is a significant decrease in avoidance responses while only a slight increase in escape latency is observed and only at the highest doses tested.

EXAMPLE 4

The procedure of Example 2 is repeated using trained rats and 0.28, 0.56, 1.12 and 2.25 mg./kg. doses of $PGE_1$. The results with animals injected 5 minutes prior to test are included in Table IV. Those data demonstrate a significant reduction in avoidance responses at doses of 0.56, 1.12 and 2.25 mg./kg. and only slight loss of escape response at the 1.12 mg./kg. and the 2.25 mg./kg. dose. At the highest dose, there is a significant effect on avoidance latency and longest run of avoidance responses with no significant effect on escape latency.

EXAMPLE 5

The procedure of Example 1 is repeated using naive rats and 1.125, 2.25 and 4.5 mg./kg. doses of $PGA_2$ administered 5 minutes prior to test. The results shown in Table V demonstrate that a significant reduction in avoidance responses is produced at doses of 2.25 and 4.5 mg./kg., but that there is no significant effect on escape latency.

EXAMPLE 6

When the procedure of Example 2 is carried out with the substitution of 0.56, 1.12, 2.25, 4.5 and 9.0 mg./kg. doses of $PGA_2$, the results shown in Table VI are obtained. From those data it is concluded that significant reductions in avoidance responses are produced by the 4.5 and 9.0 mg./kg. doses with no loss of escape responding. In addition, a significant increase in avoidance latency but not in escape latency is observed at doses of 2.25 and 4.5 mg./kg.

EXAMPLE 7

The substitution of 4.5, 9.0 and 18.0 mg./kg. doses of arachidonic acid in the assay described in Example 1 results in the data included in Table VII. From analysis of those data it is concluded that significant reductions in avoidance responses occur at all doses tested, but there is no significant effect on escape latency.

EXAMPLE 8

When 4.5, 9.0 and 18.0 mg./kg. doses of arachidonic acid are assayed according to the procedure described in Example 2, the data shown in Table VIII is obtained. Analysis of those data confirms that significant reduction in avoidance responses occur at doses of 9.0 and 18.0 mg./kg. with no loss of escape responding. At those same doses there is a greater increase in avoidance latency than in escape latency.

EXAMPLE 9

A sterile aqueous solution containing 25 mg. of the sodium salt of $PGE_2$ per ml. of solution is prepared by mixing 25 g. of $PGE_2$ sodium salt, 50 g. of lactose hydrous, 1.6 g. of sodium biphosphate anhydrous, 17.5 g. of sodium phosphate exsiccated and water q.s. 1000 ml., then filtering the resulting solution to remove microorganisms.

EXAMPLE 10

A sterile suspension is prepared by mixing 1 l. of a pharmaceutically acceptable vehicle with 30 mg. of polyethylene glycol 400 U.S.P. and 3.9 mg. of benzyl alcohol, whereupon sterilization is effected by filtration. To 150 g. of the filtrate is added 900 g. of sterile micronized $PGE_1$. The resulting mixture is pulverized and smoothed in a sterile mill and collected in a sterile container.

EXAMPLE 11

A mixture of 250 g. of micronized $PGA_2$, 650 g. of polyethylene glycol 6000 and 1000 g. of lactose is molded, thus affording 1000 suppositories, each containing 250 mg. of $PGA_2$.

EXAMPLE 12

1000 lozenges, each containing 60 mg. of active ingredient, are prepared by mixing 50 g. of micronized arachidonic acid, 150 g. of powdered polyethylene glycol 400 and 75 g. of powdered polyethylene glycol 6000, and compressing as required.

TABLE III.—MEAN VALUES UNDER CONTROL AND DRUG CONDITIONS FOR NAIVE RATS

| Measure | Control | Dose, 5 minute post injection | | |
|---|---|---|---|---|
| | | .56 mg./kg. | 1.12 mg./kg. | 2.25 mg./kg. |
| Total avoidance responses | 24.50 | [1] 10.67 | [2] 15.00 | [1] 4.33 |
| Avoidance responses, trials 1-50 | 4.25 | [2] 1.75 | 2.58 | [2] 1.33 |
| Avoidance responses, trials 51-100 | 20.25 | [1] 8.92 | [2] 12.42 | [1] 3.00 |
| Intertrial interval responses | 32.33 | 26.75 | 24.67 | 21.75 |
| Escape latency (sec.) | .85 | 1.23 | .77 | [2] 1.41 |

[1] $p \leq .01$ t test, two tailed.
[2] $p \leq .05$ t test, two tailed.

TABLE IV.—MEAN DIFFERENCE BETWEEN CONTROL AND EACH DOSE CONDITION FOR TRAINED RATS

[Positive numbers indicate the drug score was higher; negative numbers indicate the drug score was lower than control]

| Measure | Dose, 5 minute post injection | | | |
|---|---|---|---|---|
| | .28 mg./kg. | .56 mg./kg. | 1.12 mg./kg. | 2.25 mg./kg. |
| Total avoidance responses | -1.12 | [1] -14.87 | [2] -39.57 | [1] -36.25 |
| Avoidance responses, trials 1-50 | -.50 | [1] -11.37 | [2] -23.85 | [1] -18.75 |
| Avoidance responses, trials 51-100 | -.62 | -3.50 | [1] -15.71 | [1] -17.50 |
| Avoidance latency (sec.) | -.10 | -.23 | -.27 | [1] +.80 |
| Escape latency (sec.) | +.03 | [2] +.29 | [2] +.42 | +.26 |
| Longest run of responses | -3.50 | -13.00 | -10.85 | [1] 34.0 |
| Loss of escape response (percent of total trials) | 0 | 0 | .43 | 2.8 |

[1] $p \leq .05$ t test, two tailed.
[2] $p \leq .01$ t test, two tailed.

TABLE V.—MEAN VALUES UNDER CONTROL AND DRUG CONDITIONS FOR NAIVE RATS

| Measure | Control | Dose, 5 minute post injection | | |
|---|---|---|---|---|
| | | 1.125 mg./kg. | 2.25 mg./kg. | 4.5 mg./kg. |
| Total avoidance responses | 28.58 | 27.17 | [1] 13.36 | [1] 13.18 |
| Avoidance responses, trials 1-50 | 8.00 | [1] 3.42 | [2] 1.27 | [1] 2.91 |
| Avoidance responses, trials 51-100 | 20.58 | 23.75 | 12.09 | 10.27 |
| Intertrial interval responses | 33.42 | 24.92 | [1] 20.55 | 31.09 |
| Escape latency (sec.) | .57 | .75 | .57 | 1.52 |

[1] $p \leq .05$ t test, two tailed.
[2] $p \leq .01$ t test, two tailed.

TABLE I.—MEAN VALUES UNDER CONTROL AND DRUG CONDITIONS FOR NAIVE RATS

| Measure | 5 minute post injection | | | | 30 minute post injection | | | |
|---|---|---|---|---|---|---|---|---|
| | Control | .56 mg./kg. | 1.12 mg./kg. | 2.25 mg./kg. | Control | .56 mg./kg. | 1.12 mg./kg. | 2.25 mg./kg. |
| Total avoidance responses | 36.75 | [1] 22.42 | 28.00 | [2] 14.91 | 30.58 | 17.83 | 21.50 | 19.92 |
| Avoidance responses, trials 1-50 | 8.75 | [2] 4.25 | 5.73 | [2] 2.91 | 7.67 | 3.50 | 3.50 | [2] 2.58 |
| Avoidance responses, trials 51-100 | 28.00 | [1] 18.17 | 22.27 | [2] 12.00 | 22.92 | 14.33 | 18.00 | 17.33 |
| Intertrial interval responses | 37.25 | 25.75 | [2] 18.09 | [2] 18.91 | 34.67 | 29.67 | 26.25 | 31.25 |
| Escape latency (in sec.) | .54 | .53 | .60 | .90 | .72 | .70 | .68 | .78 |

[1] $p \leq .05$, two tailed t test.
[2] $p \leq .01$, two tailed t test.

TABLE II.—MEAN DIFFERENCE BETWEEN CONTROL AND EACH DOSE CONDITION FOR TRAINED RATS

[Positive numbers indicate the drug score was higher; negative numbers indicate the drug score was lower than control]

| Measure | 5 minute post injection | | | | 30 minute post injection | | | |
|---|---|---|---|---|---|---|---|---|
| | .56 mg./kg. | 1.12 mg./kg. | 2.25 mg./kg. | 4.5 mg./kg. | .56 mg./kg. | 1.12 mg./kg. | 2.25 mg./kg. | 4.5 mg./kg. |
| Total avoidance responses | -4.62 | [1] -13.62 | [1] -36.12 | [1] -79.12 | -4.88 | [2] -7.12 | -6.25 | [1] -55.00 |
| Avoidance responses, trials 1-50 | -2.38 | [2] -9.12 | [1] -20.50 | [1] -37.50 | [2] -3.25 | [2] -7.00 | -3.50 | [1] -28.88 |
| Avoidance responses, trials 51-100 | -2.25 | [2] -4.50 | [2] -15.62 | [1] -41.62 | [1] -1.62 | -.12 | -2.75 | [1] -26.62 |
| Avoidance latency (in sec.) | 1.36 | 1.60 | [1] .75 | 1.98 | .01 | [2] .28 | .33 | [1] 1.05 |
| Escape latency (in sec.) | -.02 | -.01 | [2] .16 | [2] .21 | .04 | -.12 | .05 | [1] .18 |
| Longest run of avoidance responses | -10.12 | [1] -17.88 | [1] -32.88 | [1] -38.88 | [2] -13.12 | -12.12 | [2] -20.25 | [1] -35.50 |
| Loss of escape response (percent of total trials) | 0 | 0 | 0 | 0 | 0 | 0 | 0 | 0 |

[1] $p \leq .01$, two tailed t test.
[2] $p \leq .05$, two tailed t test.

TABLE VI.—MEAN DIFFERENCE BETWEEN CONTROL AND EACH DOSE CONDITION FOR TRAINED RATS

[Positive numbers indicate the drug score was higher; negative numbers indicate the drug score was lower than control]

| Measure | Doses, 5 minute post injection | | | | |
| --- | --- | --- | --- | --- | --- |
| | .56 mg./kg. | 1.12 mg./kg. | 2.25 mg./kg. | 4.5 mg./kg. | 9.0 mg./kg. |
| Total avoidance responses | −.75 | −3.12 | −10.25 | [1] −31.75 | [2] −77.00 |
| Avoidance responses, trials 1-50 | −1.12 | −2.37 | [1] −9.62 | [1] −18.50 | [2] −36.12 |
| Avoidance responses, trials 51-100 | +.37 | −.75 | −.62 | −13.25 | [2] −40.87 |
| Avoidance latency (sec.) | −.03 | +.25 | [2] +.28 | [3] +.64 | +.20 |
| Escape latency (sec.) | +.12 | +.03 | +.21 | +.40 | [1] +.57 |
| Longest run of avoidance responses | +.12 | −7.25 | −8.12 | −23.12 | [2] −39.87 |
| Loss of escape response (percent of total trials) | 0 | 0 | 0 | 0 | 0 |

[1] $p \leq .05$ t test, two tailed.
[2] $p \leq .01$ t test, two tailed.

TABLE VII.—MEAN VALUES UNDER CONTROL AND DRUG CONDITIONS FOR NAIVE RATS

| Measure | Doses, 5 minute post injection | | | |
| --- | --- | --- | --- | --- |
| | Control | 4.5 mg./kg. | 9.0 mg./kg. | 18.0 mg./kg. |
| Total avoidance responses | 36.00 | [1] 19.25 | [1] 19.25 | [2] 14.75 |
| Avoidance responses, trials 1-50 | 10.00 | [1] 4.33 | [2] 3.08 | [2] 2.75 |
| Avoidance responses, trials 51-100 | 26.00 | [1] 14.92 | [1] 16.17 | [2] 12.00 |
| Intertrial interval responses | 48.58 | 33.33 | 35.58 | 26.50 |
| Escape latency (sec.) | .61 | .67 | .60 | .64 |

[1] $p \leq .05$ t test, two tailed.
[2] $p \leq .01$ t test, two tailed.

TABLE VIII.—MEAN DIFFERENCE BETWEEN CONTROL AND EACH DOSE CONDITION FOR TRAINED RATS

[Positive numbers indicate the drug score was higher; negative numbers indicate the drug score was lower than control]

| Measure | Dose, 5 minute post injection | | |
| --- | --- | --- | --- |
| | 4.5 mg./kg. | 9.0 mg./kg. | 18.0 mg./kg. |
| Total avoidance responses | −11.37 | [1] −19.37 | [1] −36.14 |
| Avoidance responses, trials 1-50 | [2] −8.62 | [1] −15.75 | [1] −25.14 |
| Avoidance responses, trials 51-100 | −2.75 | −3.62 | [2] −11.00 |
| Avoidance latency (sec.) | +.22 | [1] +.36 | [2] +.37 |
| Escape latency (sec.) | [3] +.38 | [1] +.18 | [2] +.15 |
| Longest run of avoidance responses | −6.25 | +4.37 | [1] −12.42 |
| Loss escape response (percent of total trials) | 0 | 0 | 0 |

[1] $p \leq .01$ t test, two tailed.
[2] $p \leq .05$ t test, two tailed.
[3] High value reflects an exceptionally long latency by only one of eight rats.

What is claimed is:

1. A method of inducing a state of tranquility in mammals which comprises administering to a mammal in need of tranquilization a tranquilizing amount of arachidonic acid.

References Cited

UNITED STATES PATENTS 3,432,541  3/1969  Bagli et al. _____ 424—305

OTHER REFERENCES

Chem. Abst., vol. 51–55, Collective Index 6th (1957–1961), p. 1117S.

SAM ROSEN, Primary Examiner